(12) United States Patent
Tomizawa

(10) Patent No.: US 6,208,690 B1
(45) Date of Patent: Mar. 27, 2001

(54) METHOD OF MOTION-COMPENSATED INTERFRAME-PREDICTION IN A VIDEO-CODING DEVICE

(75) Inventor: Naoki Tomizawa, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/925,717

(22) Filed: Sep. 9, 1997

(30) Foreign Application Priority Data

Sep. 12, 1996 (JP) .................................................. 8-241469

(51) Int. Cl.[7] ............................................. H04N 7/12
(52) U.S. Cl. .......................................... 375/240.12
(58) Field of Search .................. 375/240.13, 240.01, 375/240.12, 240.16, 240.18, 240.24; H04N 7/12

(56) References Cited

U.S. PATENT DOCUMENTS 5,481,310   1/1996   Hibi .

FOREIGN PATENT DOCUMENTS

332185    2/1991   (JP) .
6197331   7/1994   (JP) .
6327000   11/1994  (JP) .

Primary Examiner—Young Lee

(57) ABSTRACT

Motion-compensated interframe-prediction can be realized by affine-transformation of suitably divided areas of an object image with a reduced amount of calculations and an improved coding efficiency. A motion-compensated interframe-prediction method obtains a predictive video-frame from motion-vectors of an input video-frame and a reference video-frame by translating blocks of processable area, determines a prediction-error estimation value of the predictive frame from an input video-frame, compares the determined prediction-error estimation value with a preset threshold value, selects a predictive video-frame obtained by translation (parallel displacement of coordinates) and encodes the prediction-error information when the prediction-error estimation value is smaller than the threshold, or, with the prediction-error estimation value exceeding the threshold, previously prepares a plurality of area-division pattern types, obtains affine transformations of each type starting from the type having the least number of divisions, calculates a prediction-error estimation value of each type, determines the suitable type which prediction-error estimation value is smaller than the threshold, applies a predictive frame by affine-transformation, encodes the prediction-error information and outputs the predictive frame together with side-information such as motion-vectors and area-dividing information.

5 Claims, 8 Drawing Sheets

• : EXISTING MOTION VECTOR

FIG.4

• : EXISTING MOTION VECTOR

METHOD OF MOTION-COMPENSATED INTERFRAME-PREDICTION IN A VIDEO-CODING DEVICE

BACKGROUND OF THE INVENTION

Video communication services, e.g., television telephone services and video conferencing services have been realized over high-speed digital networks such as ISDN (Integrated Service Digital Network).

Recently, with the spread of radio transmission networks represented by PHS (Personal Handy phone System), the progress of data modulation/demodulation techniques for PSTN (Public Switched Telephone Network) and the advance of image compressing techniques, there have been increasing demands for video communication services over lower bit-rate networks.

As well known, H.261 and H.263 are internationally established standard coding methods for compressing video information. These standardized video-coding methods adopt a hybrid video coding method performing interframe-prediction coding in combination with intraframe-prediction coding.

The interframe-prediction coding is to generate a predictive video-frame from a reference video-frame and encode a difference of the predictive frame from a current video-frame to reduce the number of codes to be transmitted. This enables effective use of transmission lines.

The interframe-prediction coding is made by using any one of methods of block-matching, affine transforming, warp prediction and so on. A conventional interframe-prediction method using affine transformation is explained as follows:

The affine transformation itself is first described. The affine transformation is obtained by mapping from a video-frame to another video-frame by using 6 parameters representing a map. The affine transformation is usually conducted on a triangle area for simplifying calculation of affine parameters.

To explain a method of interframe-prediction by using affine transformation in the case of forward predicting, motion vectors of control grid points A, B, C and D on the current video-frame are detected at corresponding control grid points A', B', C' and D' on a reference video-frame.

Three of four control grid points are first selected and an area is divided to determine affine parameters. For example, an area on a current video-frame is divided into two triangles ABC and BCD therein and a corresponding area on the reference video-frame is divided into two angles A'B'C' and B'C'D' therein.

On the triangles into which the area is divided, affine parameters are determined from vertex positions of each triangle (vertex positions of one triangle and motion vectors of the other triangle may be used).

A predictive video-frame is generated by mapping thereto all pixels of all triangular areas according to the obtained affine parameters.

A method of dividing an image into adaptive areas is as follows:

First, basic motion-vectors is searched on control grid points of a square area consisting of 16 by 16 pixels. Additional motion-vectors are also searched at control grid points of a square area consisting of 8 by 8 pixels.

There are area-dividing patterns in case of affine transformation by using the basic motion-vectors or additional motion-vectors. In one example, simplified area-dividing patterns may be used. In the other example, there are area-dividing patterns including a pattern for translation. Type 1 is a pattern for translation, type 2 and 3 are two-divisional (bisectional) patterns (for two times of affine-transformations), types 4 to 7 are five-divisional (pentasectional) patterns (for five times of affine-transformations) and types 8 and 9 are eight-divisional (octasectional) patterns (for eight times of affine-transformations). Among these types, suitable one may be selected to use.

To explain an example (A) of prior art motion-compensated interframe-prediction flow. At 1st step, motion-vectors are obtained from an input video-frame and a reference video-frame. At 2nd step, affine transformation is conducted for respective types of area-dividing patterns for each block. At 3rd step, prediction-error estimation values for translated area (type 1) and affine-transformed areas (types 2 to 9) are calculated and the area-dividing pattern type having a minimal estimated value of prediction error is determined. At 4th step, side information (e.g., the determined type of area-dividing pattern and motion vectors) is encoded.

To explain another example (B) of prior art motion-compensated interframe prediction flow. At 1st step, motion vectors are searched. At 2nd step, affine transformation is performed for respective two-division types 2 and 3 (two times for each type). At 3rd step, prediction-error estimation values for translated area (type 1) and affine-transformed areas (types 2 and 3) are calculated and one of the three types of area-dividing patterns, which has a minimal estimation value of prediction error, is determined. At 4th step, the minimal estimation value of the type is compared with a preset threshold value T and the type is accepted to use if its estimated value is smaller than the threshold value T. At 5th step, side information is encoded. The process returns to 1st step if the estimation value larger than the threshold T.

At 1st step, motion-vectors are searched. At 2nd step, affine transformation is performed for respective five-division types 4 to 7 (five times for each type). At 3rd step, prediction-error estimation values of the affine-transformed areas (types 4 to 7) are calculated and one of the types of area-dividing patterns, which has a minimal estimation value of prediction error, is determined. At 4th step, the minimal estimation value of the type is compared with a preset threshold value T and the type is accepted to use if its estimation value is smaller than the threshold T. At 5th step, side information is encoded. The process returns to 1st step if the estimation value larger than the threshold T.

At 1st step, motion-vectors are used. At 2nd step, affine transformation is performed for respective eight-division types 8 and 9 (eight times for each type). At 3rd step, prediction-error estimation values for affine-transformed areas (types 8 and 9) are calculated and either one of the types, which has a smaller estimation value of prediction error, is determined. The type thus accepted to use is encoded as side information at 5th step.

The prior art (A) conducts affine transformation of all types to determine an adapted area-dividing pattern. Therefore, it must conduct many times of affine transformation by performing a large amount of calculation.

The prior art (B) performs affine transformation fewer times than the prior art (A) does. However, this art always first conducts affine transformation of two-division (bisectional) areas, which may be of no use if translated type is selected. In case of conducting affine transformation and determining a prediction-error estimation value, types 2 and 4 are the same and affine transformation of the latter is unnecessary in practice.

SUMMARY OF THE INVENTION

The present invention relates to a motion-compensated interframe-prediction method (particularly using warp-prediction method) in a video-coding device for encoding prediction-error information being a difference between an input video frame and a predictive video frame obtained by performing motion-compensated interframe-prediction and, more particularly, to a motion-compensated interframe-prediction method used in a video-coding device which is provided with a motion-compensated interframe-prediction system by adaptively changing an area to be subjected to affine transformation.

The present invention was made to provide a motion-compensated interframe prediction method for use in a video coding device, which is free from the above-mentioned disadvantages of the prior arts.

The disadvantages associated with the prior arts are overcome by the present invention of a method of motion-compensated interframe-prediction, which: determines a predictive video-frame by translating a block-processable area from motion-vectors and a reference video-frame; determines a prediction error estimation value of the predictive video-frame from an input video-frame, compares the determined prediction-error estimation value with a preset threshold value, selects a video-frame obtained by translation (parallel displacement of coordinates) and encodes the prediction-error information when the prediction-error estimation value is smaller than the threshold; or, with the prediction-error estimation value exceeding the threshold, divides a processable area into divisions suitable for the input video-frame from the motion-vectors and the reference video-frame, selects a predictive video-frame obtained by affine transformation, encodes the prediction-error information and outputs the predictive video-frame information together with side-information such as motion-vectors and area-dividing pattern information; which obtains suitable divisions of a processable area of the input video-frame by previously prepare a plurality of block-triangulation patterns (types of dividing a block into triangular divisions), calculating a prediction-error estimation value of each type starting from the type having the least number of divisions, judging the suitability of the type by comparing the calculated prediction-error estimation value with the threshold and accepting it as an adapted type of area-dividing pattern when the prediction-error estimation value is smaller than the threshold; which, in case of an input video-frame having an increased number of codes, reduces the number of motion-vectors and uses larger thresholds for discriminating the suitability of types having larger number of divisions to save an amount of calculating operations; which previously prepares a plurality of block-triangulation patterns (types of dividing a block into triangular divisions), perform affine transformation of each type of divided area, calculates prediction-error values of respective pattern types with respective weight values preset in such a way that the larger number of divisions may have the relatively larger prediction-error estimation value, selects the pattern type having the smallest prediction-error estimation value and encodes the prediction-error information which divides each block into triangle areas, perform affine transformation of respective areas and stores affine-transformed data, determines an adaptive division-type for each block by reading and summing the stored estimation values of triangle areas composing a block, calculating an error-estimation value for each block by using the summed value, and selecting the division-type with the smallest error estimation value which conducts affine transformation for each triangle area and calculates a prediction-error estimation value of each area with a preset weight value realizing that a smaller triangle may have a relatively larger estimation value to reduce an amount of calculations.

PREFERRED EMBODIMENTS OF THE INVENTION

Video communication services, e.g., television telephone services and video conferencing services have been realized over high-speed digital networks such as ISDN (Integrated Service Digital Network).

Recently, with the spread of radio transmission networks represented by PHS (Personal Handy phone System), the progress of data modulation/demodulation techniques for PSTN (Public Switched Telephone Network) and the advance of image compressing techniques, there have been increasing demands for video communication services over lower bit-rate networks.

As well known, H.261 and H.263 are internationally established standard coding methods for compressing video information. These standardized video-coding methods adopt a hybrid video coding method performing interframe-prediction coding in combination with intraframe-prediction coding.

The interframe-prediction coding is to generate a predictive video-frame from a reference video-frame and encode a difference of the predictive frame from a current video-frame to reduce the number of codes to be transmitted. This enables effective use of transmission lines.

The interframe-prediction coding is made by using any one of methods of block-matching, affine transforming, warp prediction and so on. A conventional interframe-prediction method using affine transformation is explained as follows:

The affine transformation itself is first described. The affine transformation is obtained by mapping from a video-frame to another video-frame by using 6 parameters representing a map. The affine transformation is usually conducted on a triangle area for simplifying calculation of affine parameters.

Figure 1:
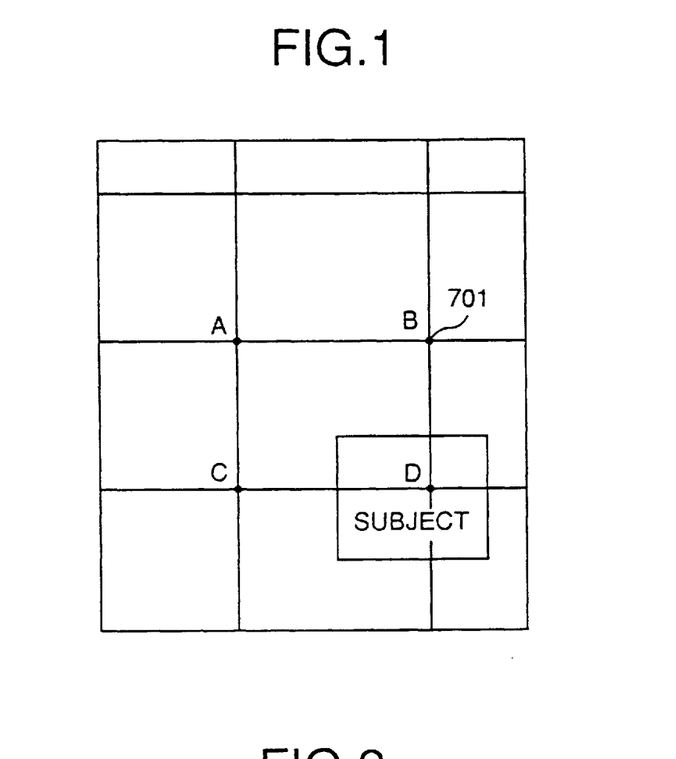
FIGS. 1 and 2 are views for explaining interframe-prediction by using affine transformation when forward prediction with a deformation of a subject to be mapped.
Figure 2:
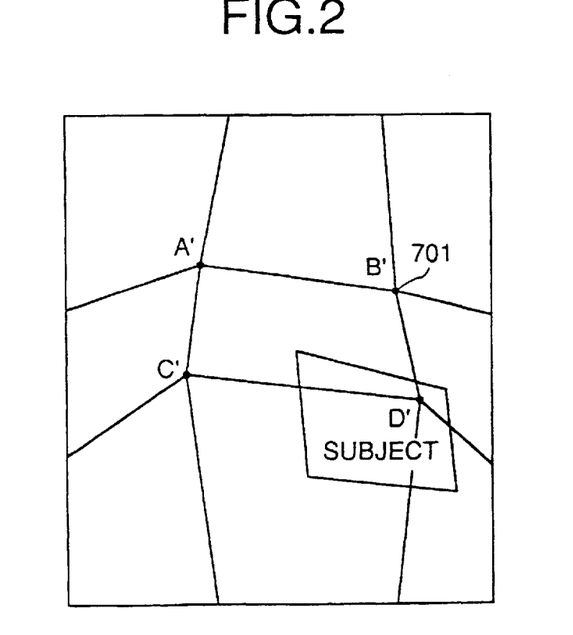

FIGS. 1 and 2 are views for explaining a method of interframe-prediction by using affine transformation in the case of forward predicting. In FIGS. 1 and 2, numeral 701 denotes control grids.

Motion vectors of control grid points A, B, C and D on the current video-frame are detected at corresponding control grid points A', B', C' and D' on a reference video-frame.

Three of four control grid points are first selected and an area is divided to determine affine parameters. For example, an area on a current video-frame is divided into two triangles ABC and BCD therein and a corresponding area on the reference video-frame is divided into two angles A'B'C' and B'C'D' therein.

On the triangles into which the area is divided, affine parameters are determined from vertex positions of each triangle (vertex positions of one triangle and motion vectors of the other triangle may be used).

A predictive video-frame is generated by mapping thereto all pixels of all triangular areas according to the obtained affine parameters.

Figure 3:
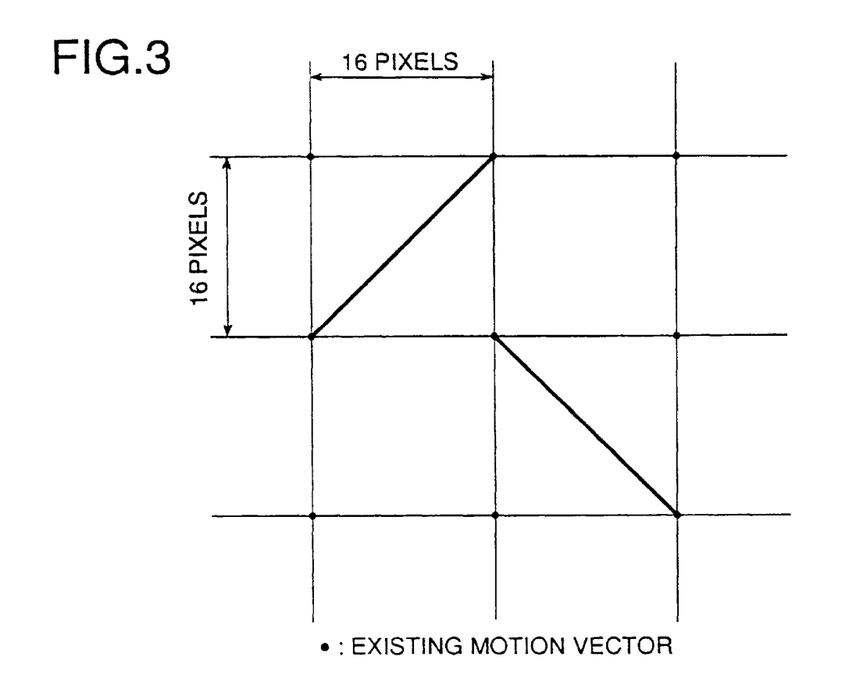
FIG. 3 shows motion vectors necessary for affine transformation in case of performing motion-compensated interframe-prediction by the affine transformation.
Figure 4:
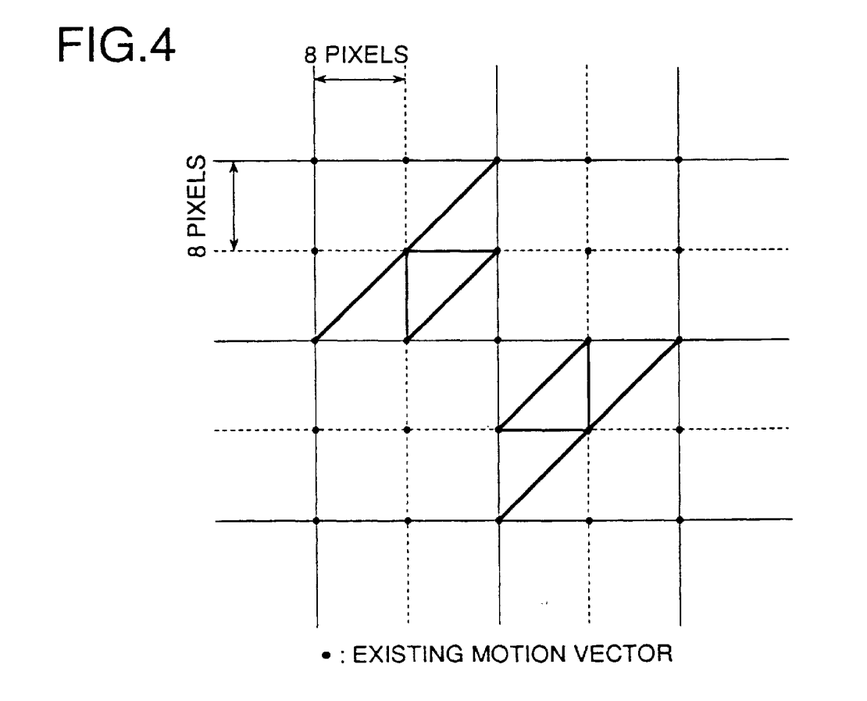
FIG. 4 shows another motion vectors necessary for affine transformation in case of performing motion-compensated interframe-prediction by the affine transformation.
Figure 5:
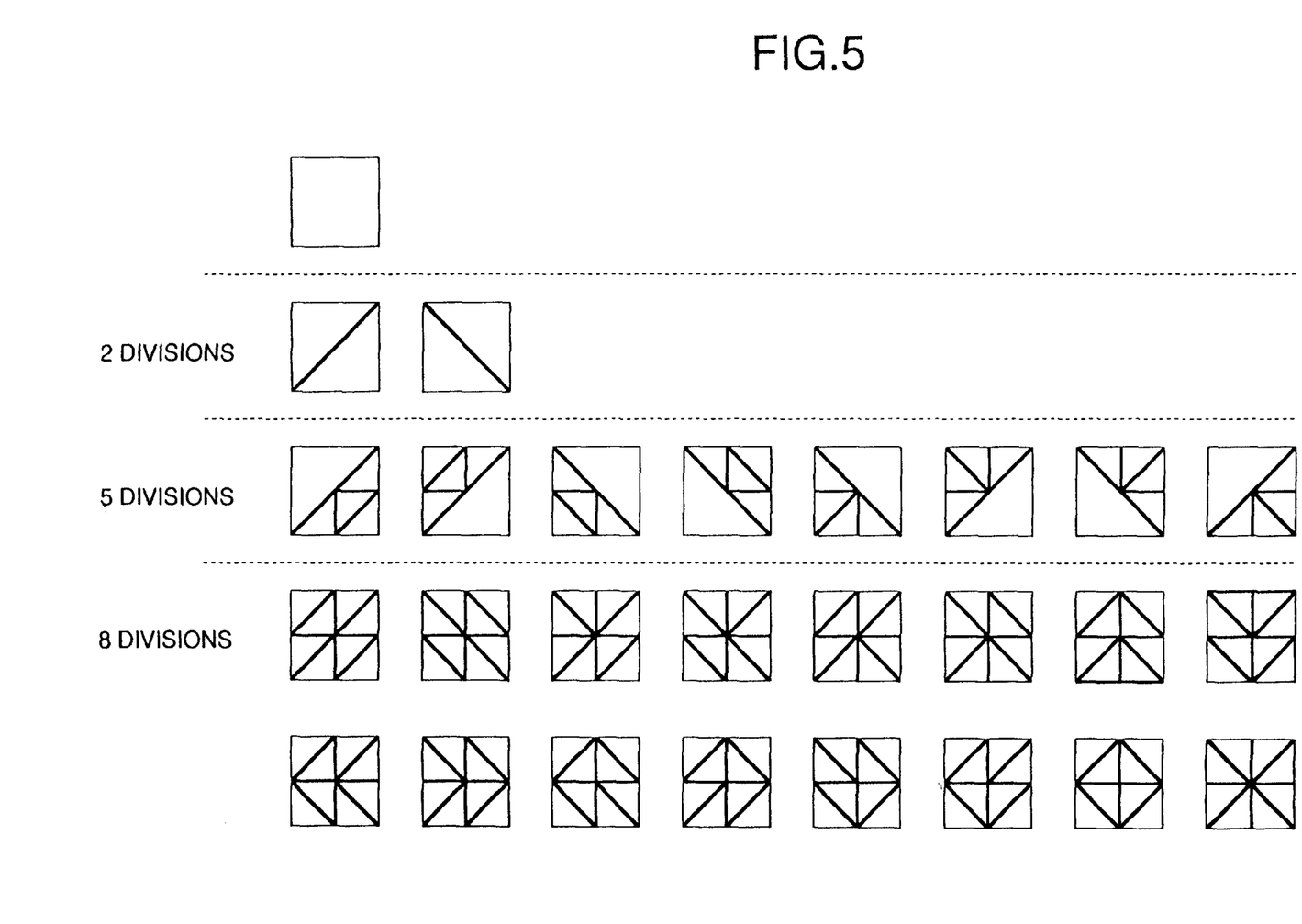
FIG. 5 shows an example of block area dividing patterns when performing motion-compensated interframe-prediction according to the present invention.
Figure 6:
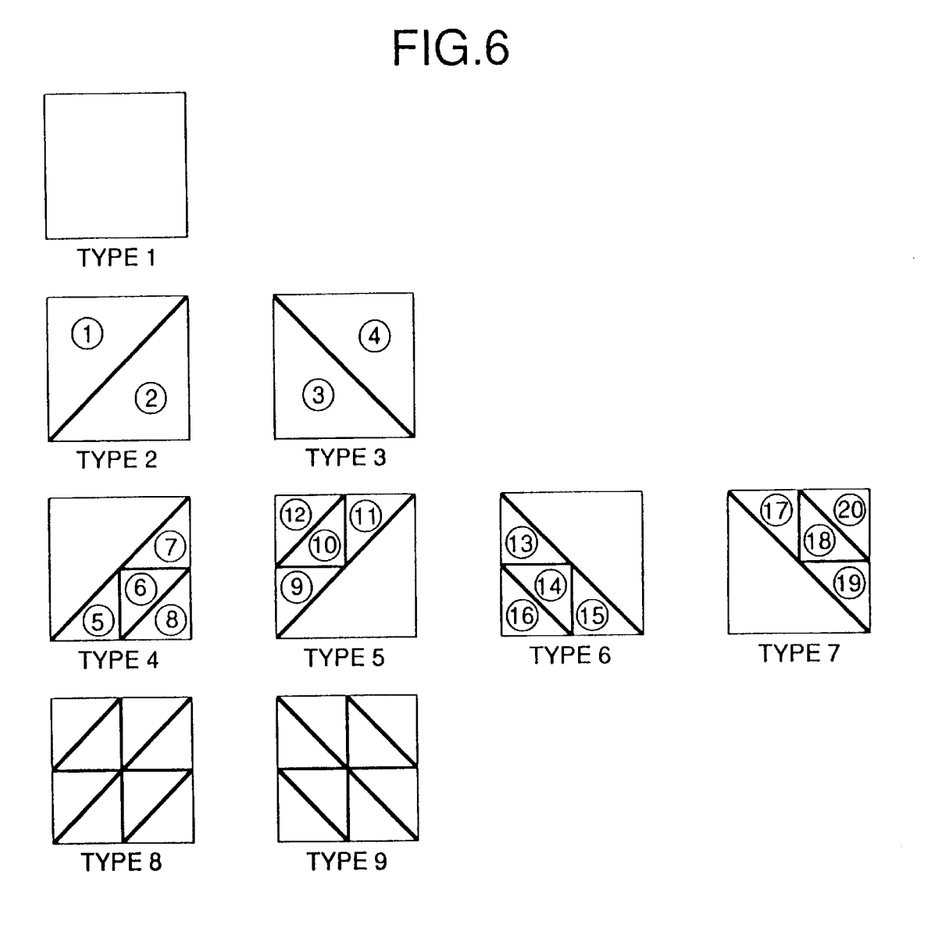
FIG. 6 shows an example of block area dividing patterns when conducting motion-compensated interframe-prediction according to the present invention.

A method of dividing an image into adaptive areas is as follows:

First, basic motion-vectors is searched on control grid points of a square area consisting of 16 by 16 pixels as shown in FIG. 3. Additional motion-vectors are also searched at control grid points of a square area consisting of 8 by 8 pixels as shown in FIG. 4. Referring to FIGS. 5 and 6, there are shown examples of area-dividing patterns in case of affine transformation by using the basic motion-vectors or additional motion-vectors. In FIG. 5, simplified area-dividing patterns may be used. In FIG. 6, there are shown 9 area-dividing patterns including a pattern for translation. Type 1 is a pattern for translation, type 2 and 3 are two-divisional (bisectional) patterns (for two times of affine-transformations), types 4 to 7 are five-divisional (pentasectional) patterns (for five times of affine-transformations) and types 8 and 9 are eight-divisional (octasectional) patterns (for eight times of affine-transformations). Among these types, suitable one may be selected to use.

Figure 7:
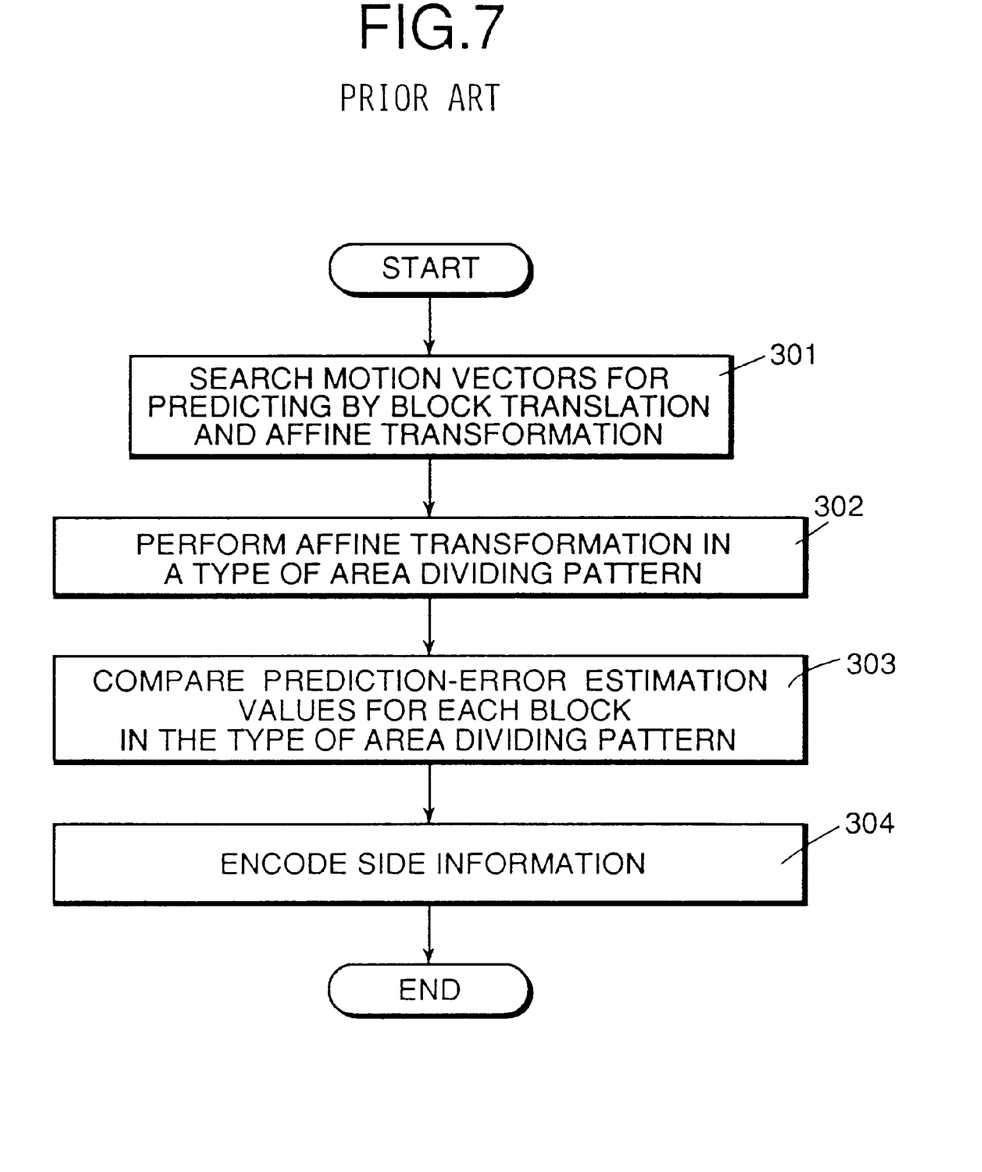
FIG. 7 is a flow chart describing an example of a conventional motion-compensated interframe-predicting method used in a video coding device.

FIG. 7 is a flow chart for explaining an example (A) of prior art motion-compensated interframe-prediction flow. At Step 301, motion-vectors are obtained from an input video-frame and a reference video-frame. At Step 302, affine transformation is conducted for respective types (2 to 9 in FIG. 6) of area-dividing patterns for each block. At Step 303, prediction-error estimation values for translated area (type 1) and affine-transformed areas (types 2 to 9) are calculated and the area-dividing pattern type having a minimal estimated value of prediction error is determined. At Step 304, side information (e.g., the determined type of area-dividing pattern and motion vectors) is encoded.

Figure 8:
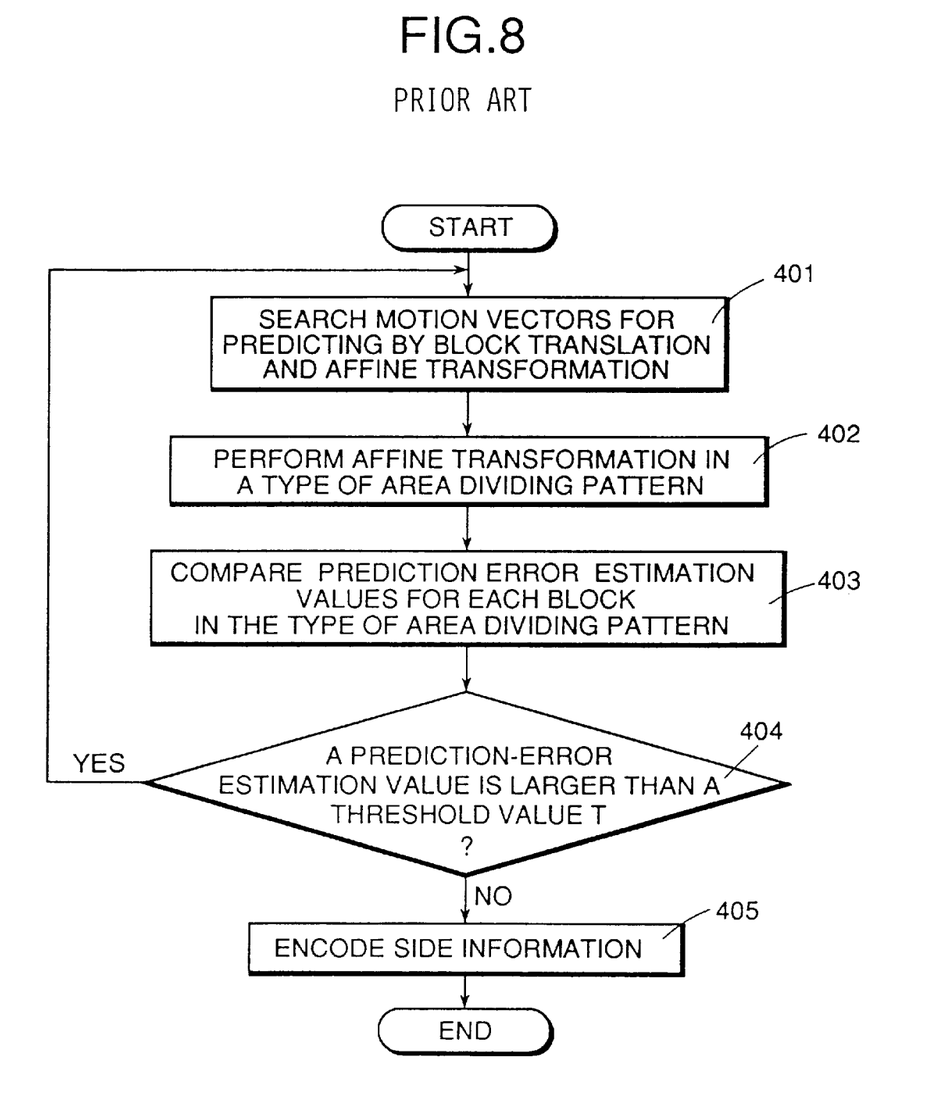
FIG. 8 is a flow chart describing another example of a conventional motion-compensated interframe-predicting method used in a video coding device.

FIG. 8 is a flow chart for explaining another example (B) of prior art motion-compensated interframe prediction flow.

At Step 401, motion vectors shown in FIG. 3 are searched. At Step 402, affine transformation is performed for respective two-division types 2 and 3 (two times for each type). At Step 403, prediction-error estimation values for translated area (type 1) and affine-transformed areas (types 2 and 3) are calculated and one of the three types of area-dividing patterns, which has a minimal estimation value of prediction error, is determined. At Step 404, the minimal estimation value of the type is compared with a preset threshold value T and the type is accepted to use if its estimated value is smaller than the threshold value T. At Step 405, side information is encoded. The process returns to Step 401 if the estimation value larger than the threshold T.

At Step 401, motion-vectors shown in FIG. 4 are searched. At Step 402, affine transformation is performed for respective five-division types 4 to 7 (five times for each type). At Step 403, prediction-error estimation values of the affine-transformed areas (types 4 to 7) are calculated and one of the types of area-dividing patterns, which has a minimal estimation value of prediction error, is determined. At Step 404, the minimal estimation value of the type is compared with a preset threshold value T and the type is accepted to use if its estimation value is smaller than the threshold T. At Step 405, side information is encoded. The process returns to Step 401 if the estimation value larger than the threshold T.

At Step 401, motion-vectors shown in FIG. 4 are used. At Step 402, affine transformation is performed for respective eight-division types 8 and 9 (eight times for each type). At Step 403, prediction-error estimation values for affine-transformed areas (types 8 and 9) are calculated and either one of the types, which has a smaller estimation value of prediction error, is determined. The type thus accepted to use is encoded as side information at Step 405.

The prior art (A) conducts affine transformation of all types to determine an adapted area-dividing pattern. Therefore, it must conduct many times of affine transformation by performing a large amount of calculation.

The prior art (B) performs affine transformation fewer times than the prior art (A) does. However, this art always first conducts affine transformation of two-division (bisectional) areas, which may be of no use if translated type is selected. In case of conducting affine transformation and determining a prediction-error estimation value, types 2 and 4 (net portion) shown in FIG. 6 are the same and affine transformation of the latter is unnecessary in practice.

(First Embodiment)

Figure 9:
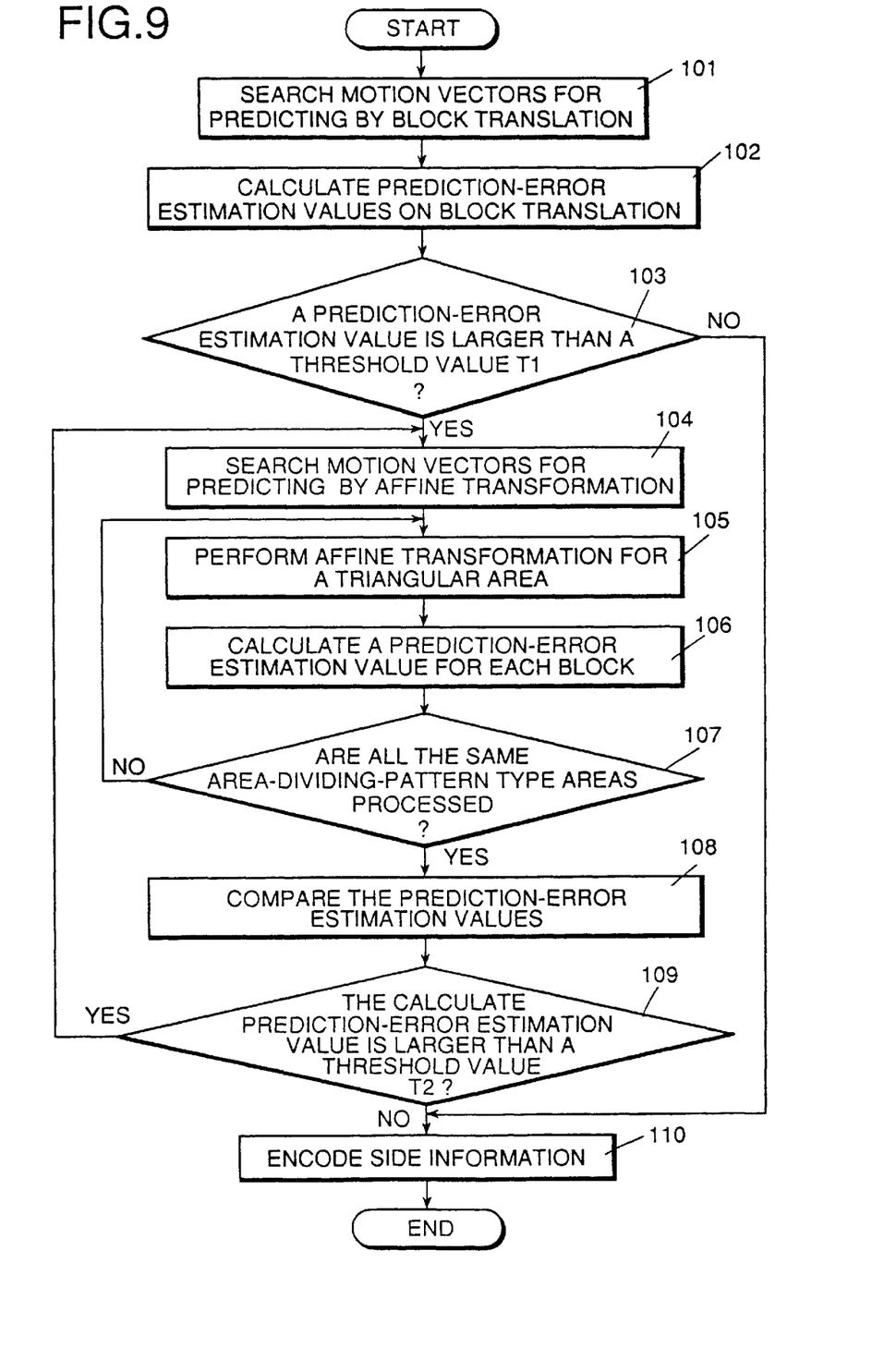
FIG. 9 is a flow chart describing a procedure of motion-compensated interframe-predicting method used in a video coding device, which is a first embodiment of the present invention.

FIG. 9 is a flow chart depicting a control process of motion-compensated interframe-prediction according to a first embodiment of the present invention.

At Step 101, motion vectors necessary for motion-compensated interframe-prediction by block translation are searched. For example, motion-vectors of a center pixel of a micro-block representing pixels thereof is searched. An example of searching is as follows: An area (mask) including at its center an objective pixel whose motion-vector shall be found on a predictive frame is set, differences of the pixel from all other pixels coexisting within the same area are calculated and a displacement to a pixel having a least differential value is selected as a motion-vector. In this case, the pixels within the searching area mask may include half pixel having an average pixel value between two neighboring pixels.

At Step 102, an estimation value of once-error information amount (prediction-error) is calculated from the predictive video-frame obtained by translating of a block by using the above-mentioned motion-vector and an input video-frame. The estimation value of prediction error may be calculated for example as a sum of absolute difference (SAD) between the predictive image and the input image or a mean square value of said two images.

At Step 103, the estimation value is compared with a preset threshold value T1. When the estimation value is smaller than the threshold value T1, the block translation mode is selected for motion-compensated prediction and the translation pattern type (type 1 in FIG. 6) is adopted as a block in the predictive video-frame. The process then advances to Step 110 without performing affine transformation and other processings (i.e., omitting Step 104 to 109).

When the estimation value exceeds the threshold value T1, the affine transformation mode is selected for motion-compensated prediction and the process returns to Step 104. In this case, the threshold value T1 may not always be constant but may be variable. Namely, with video showing a large motion of a subject image requiring an increased number of codes, the coding device control system may increase the threshold to make the block translation mode be more selectable for saving the number of codes.

At Step 104, basic motion-vectors on a control grid as shown in FIG. 4 are searched in the same way as described in Step 101.

At Step 105, affine transformation is performed from the motion-vectors for a triangular area included in a pattern type 2 or 3 shown in FIG. 6.

At Step 106, an error estimation value of motion-compensated prediction made by affine transformation at Step 105 is calculated in the same way as described for Step 102.

Step 107 is provided for calculating error estimation values of the same type areas having the same number of divisions.

At Step 108, prediction-error estimation values calculated for types 2 and 3 are compared with each other to select either one type having smaller estimation value.

At Step 109, the calculated prediction-error estimation value of the selected type is further compared with a preset threshold value T2 to determine whether the area type can be applied for actual motion-compensated prediction. The selected type is adopted as a predictive video-frame when the estimation value is smaller than the threshold T2.

At Step 110, the selected type-number and the motion-vectors are encoded as side information.

With the calculated prediction-error estimation value exceeding the threshold T2, the process returns to Step 104 whereat additional motion vectors shown in FIG. 4 are searched. The search method is the same as described for Step 101.

At Step 105, affine transformation is performed for triangles included in any one of the types 4 to 7 shown in FIG. 6. A prediction-error value for the type is calculated at Step 106. Then prediction-error estimation values of the types 4 to 7 are determined on the conditions of Step 107.

At Step 108, the estimated-prediction estimation error values of the types 4 to 7 are compared with each other to determine the type having the smallest estimation value. Step 109, the estimation value of the selected type is compared with the threshold T2. The selected type is applied as a predictive frame if its calculated prediction-error estimation value is smaller that the threshold T2. If not, the process returns again to Step 104 whereat types 8 and 9 are subjected to the processing steps 104 to 109.

In this case, Step 104 may not be executed since additional vectors were already obtained in the process made for the types 4 to 7. The block translation type or bisectional type 2 or 3 (i.e., having two divisions) can be selected as default feature if the prediction-error estimation values of all types should exceed the threshold T2.

At Step 110, the area-dividing type thus selected and motion-vectors used for block translation or affine transformations are encoded and output as side information.

By way of another example, prediction-error estimation values for area-division types may be calculated with such preset weight values that types having larger number of divisions may have relatively larger prediction-error estimation values, i.e., prediction-error estimation value may increase with an increase in the number of divisions in the order of bisectional (types 2 and 3), pentasectional (types 4 to 7) and octasectional (types 8 and 9) as shown in FIG. 6. This makes it possible to easily select the types having a smaller quantity of divisions.

(Second Embodiment)

The first embodiment of the present invention and the prior arts previously set a plurality of area-division types for adequately dividing an image frame into areas to be processed for motion-compensated prediction by affine transformation and select one of them.

FIG. 6 shows an example of different types 2 to 9 of area-division patterns, which, however, contain areas to be performed the same affine transformations. The number of affine transforming operations necessary for determining prediction error values for all types 2 to 9 is 20 when the same area is processed at a time as described above. On the other hand, affine-transformation shall be repeated 40 times for the types 2 to 9 if these types are independently processed.

Figure 10:
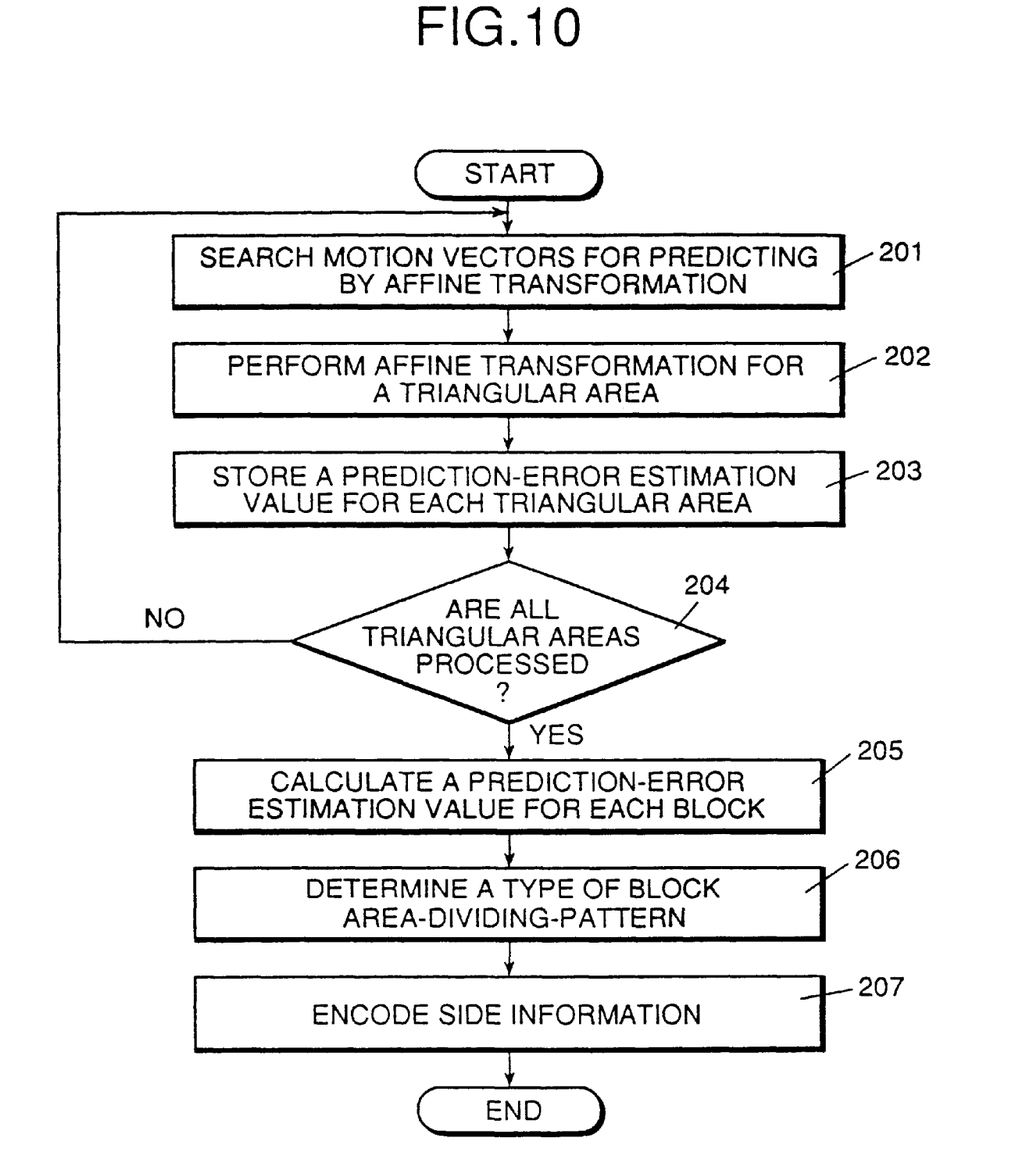
FIG. 10 is a flow chart describing a procedure of motion-compensated interframe-predicting method used in a video coding device, which is a second embodiment of the present invention.

FIG. 10 is a flow chart describing the operation steps of a second embodiment of the present invention, which is made in view of the above-mentioned problems. At Step 201, basic and additional motion vectors are searched in the same way as described in the first embodiment.

At Step 202, affine transformation is conducted in one of triangular areas ① to ⑳ (areas shown by encircled numerals in FIG. 6).

At Step 203, a prediction-error estimation value of said area is determined and temporarily stored. The calculation of the prediction-error estimation value may be performed for respective areas with respective weight values in such a way that the triangular areas ⑤ to ⑳ relatively small in comparison with the triangular areas ① to ④ may have larger prediction-error estimation values.

On the condition of Step 204, 20 triangular areas ① to ⑳ (FIG. 6) are all processed in affine transformation to calculate respective prediction-error estimation values.

At Step 205, a prediction-error estimation value for each area-division type is calculated by summing relevant values among the prediction-error estimation values of the triangular areas ② to ⑳ temporarily stored. Thus, prediction-error estimation values for respective blocks (types ② to ⑳) are obtained.

At Step 206, an area-division type having a least error value is determined on the basis of the thus obtained prediction-error estimation values of respective blocks.

As described in the first embodiment, it is also possible to determine the applicability of respective area-division types by comparing their estimated prediction-error estimation values with the threshold T2 in the order from bisectional area types (types 2, 3) to the octasectional area types and/or with respective weights given to the types in such a way that types having larger number of divisions may have relatively larger prediction-error estimation values.

At Step 207, side information is encoded and output.

As is apparent from the foregoing description, the present invention offers the following advantageous effects:

According to the present invention, it is possible to determine first a prediction-error estimation value by block translation and use the block translation for motion-compensated interframe-prediction if the determined prediction-error estimation value is smaller than a threshold value. Since a video-frame may contain blocks that may allow motion-compensated prediction without affine transformation, the amount of calculating operations for affine transformation of such blocks can be correspondingly reduced, because of eliminating the need of searching motion vectors.

According to the present invention, it is possible to determine (if the error estimation value of prediction by block translation exceeds the threshold) prediction-error estimation values of area-division types having a smaller number of divisions (i.e., requiring a fewer times of affine transformations) and, when the error estimation value is smaller than the threshold, use said type without further affine transformation for the other types. This reduces the amount of calculating operations by omitting the excessive affine transformation and eliminating the amount of calculating operation relevant to decrease of motion-vector searching operation.

According to the present invention, it is possible to dynamically change the threshold value in accordance with an amount of codes of a video-frame, thus reducing the amount of calculation and improving efficiency of codes. This can increase the efficiency of the coding system.

According to the present invention, it is possible to determine prediction-error estimation values of the area-division types having a larger number of divisions with weights for increasing the prediction-error estimation value, thus allowing the types having a smaller number of divisions to be more easily selected. This reduces the code amount of motion-vectors in side information and improves the coding efficiency.

According to the present invention, it is possible to store prediction-error estimation values obtained by affine transformation for respective triangular areas, thus reducing the number of the affine transformations and correspondingly saving amount of the calculating operations. This eliminates the need for repeating searching motion-vectors, thus improving the efficiency of processing.

According to the present invention, it is also possible to determine prediction-error estimation value of each area-division type with weighting smaller triangles in the area-division type, thus obtaining the same effect above-described.

What is claimed is:

1. A method of motion-compensated interframe-prediction in a video-coding device for encoding prediction-error information of a difference between an input video-frame and a predictive video-frame obtained by performing motion-compensated interframe-prediction, which comprises the steps of:

determining a predictive video-frame by translating a block of a processable area from motion-vectors and a reference video-frame;

determining a prediction-error estimation value of the predictive video-frame from an input video-frame;

comparing the determined prediction-error estimation value with a preset threshold value;

selecting the predictive video-frame obtained by translation and encoding a prediction-error information of the predictive video-frame when the determined prediction-error estimation value by translation is smaller than the threshold value; or selecting a predictive video-frame obtained by affine transformation with a processable area divided into divisions suitable for the input video-frame from motion-vectors and a reference video-frame, and encoding a prediction-error information of the predictive video-frame when the determined prediction-error estimation value exceeds the threshold value; and outputting the predictive video-frame and side-information such as motion-vectors and area-division information, wherein suitable divisions of a processable area of the input video-frame is obtainable by:

dividing a video-frame in advance into a plurality of blocks, preparing a plurality of types to divide a block into triangular divisions, calculating a prediction-error estimation value of each division type, starting from the division-type having the least number of divisions, comparing the calculated prediction-error estimation value with the threshold, and selecting it as a suitable division-type of area-dividing when the prediction-error estimation value is smaller than the threshold.

2. A method of motion-compensated interframe-prediction in a video-coding device as defined in claim 1 wherein the threshold is dynamically changeable for making the translation or the division-type having a smaller number of divisions more selectable in case of an input video-frame having an increased number of codes.

3. A method of motion-compensated interframe-prediction in a video coding device as defined in claim 1 wherein a prediction-error estimation value of each block is determined by calculating prediction-error estimation values of its triangular areas previously weighted so as to make smaller triangles have relatively larger prediction-error estimation values.

4. A method of motion-compensated interframe-prediction in a video coding device as defined in claim 1 wherein the prediction-error estimation value is determined by using a sum of absolute difference between a predictive video image and an input video image.

5. A method of motion-compensated interframe-prediction in a video coding device as defined in claim 1 wherein the prediction-error estimation value is determined by using a square mean value of difference between a predictive video image and an input video image.

* * * * *